ial type of motor vehicle 25 in connection

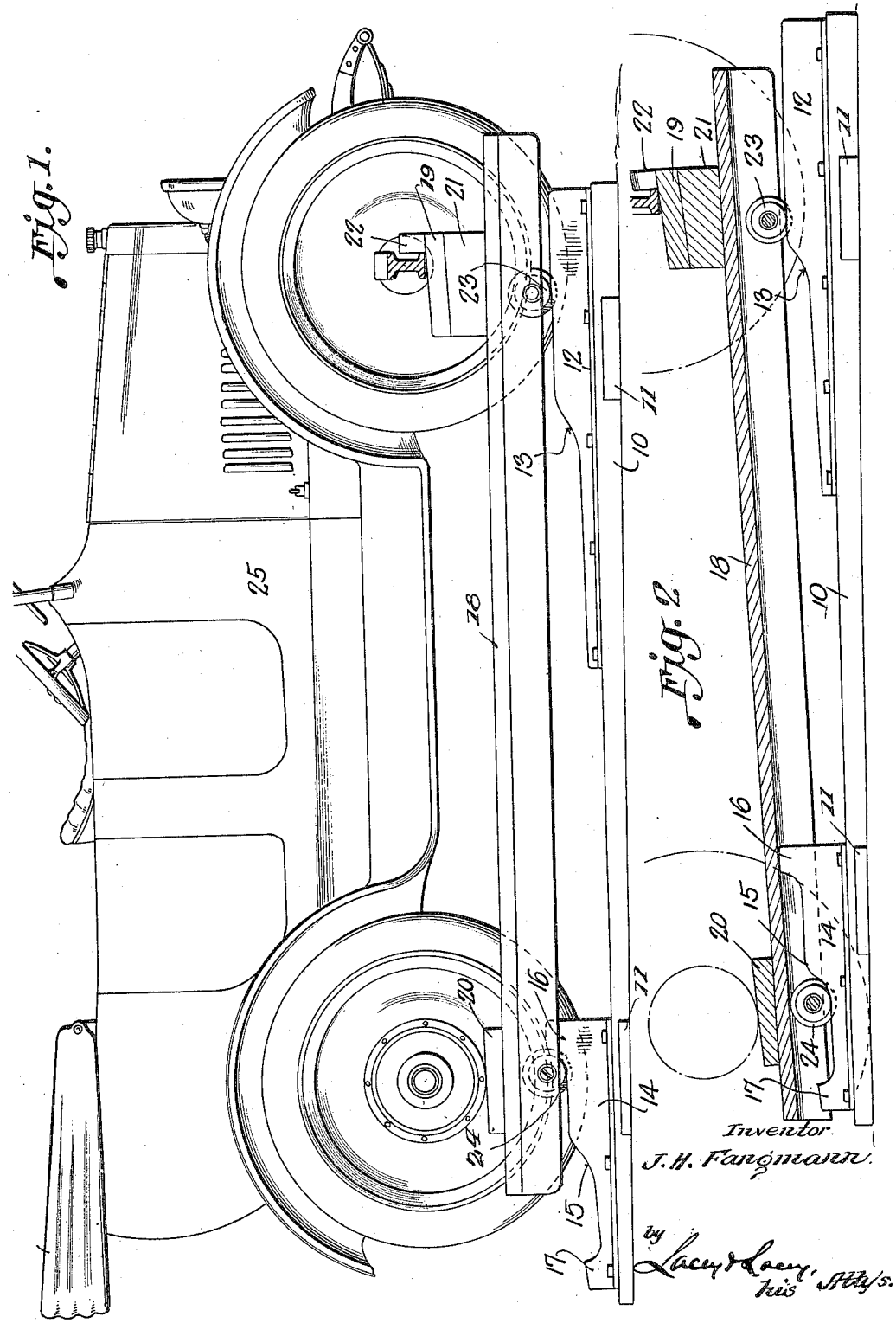

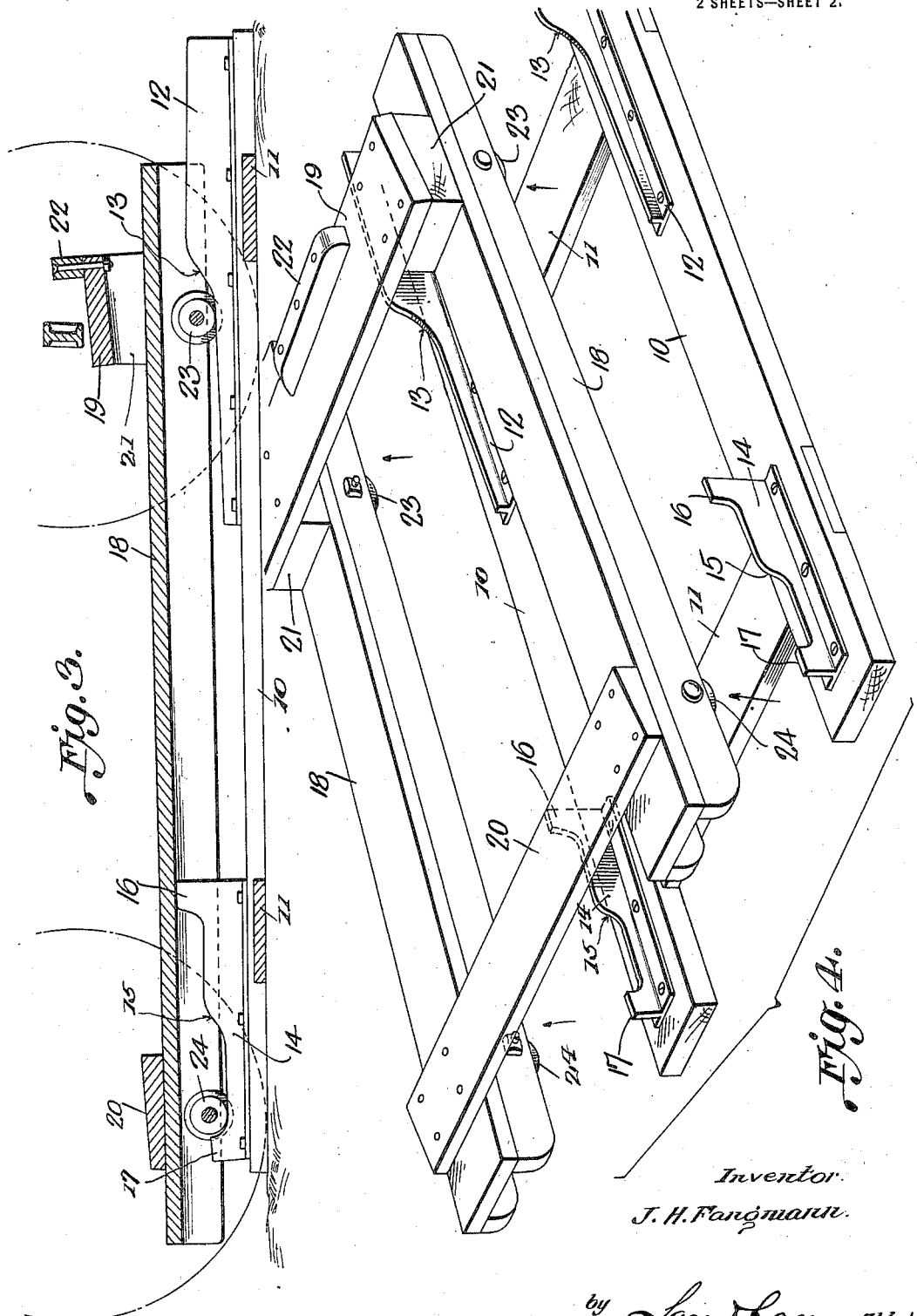

UNITED STATES PATENT OFFICE.

JOHN H. FANGMANN, OF TEMPLETON, IOWA.

LIFT FOR MOTOR-VEHICLES.

1,390,109.   Specification of Letters Patent.   Patented Sept. 6, 1921.

Application filed March 6, 1920. Serial No. 363,651.

*To all whom it may concern:*

Be it known that I, JOHN H. FANGMANN, citizen of the United States, residing at Templeton, in the county of Carroll and State of Iowa, have invented certain new and useful Improvements in Lifts for Motor-Vehicles, of which the following is a specification.

This invention relates to an improved automobile lift and has as one of its principal objects to provide a device of this character whereby an automibile may, by its own traction and momentum, lift its wheels clear of the ground so that when the automobile is left standing in a garage or other place of storage, the tires of the vehicle will be relieved of the weight thereof.

The invention has as a further object to provide a device wherein the traction of the automobile will be utilized in lifting the front wheels thereof clear of the ground and wherein the momentum of the vehicle will then be employed for lifting the rear wheels thereof clear of the ground.

And the invention has as a still further object to provide a device which may be employed in connection with substantially any conventional type of vehicle.

Other and incidental objects will appear hereinafter.

In the drawings:

Figure 1 is a side elevation of my improved lift showing a conventional type of automobile thereon.

Fig. 2 is an elevation showing the manner in which the device operates to first lift the front wheels of the vehicle clear of the ground.

Fig. 3 is a longitudinal section showing the normal position of the carriage of the device, and Fig. 4 is a fragmentary perspective view showing the carriage and its track in detail.

In carrying the invention into effect, I employ a track frame which includes longitudinal sills 10 connected at their end portions by cross pieces 11. Mounted upon the forward end portions of said sills is a pair of front track rails 12. These rails are substantially T-shape in cross section and the horizontal flanges thereof are secured, by suitable fastening devices, to the sills so that the rails are thus firmly held in place. The vertical upstanding flanges of said rails are cut away at their inner end portions to provide inclines 13 sloping to the summits of the rails, said inclines respectively extending about half the length of each of the rails. Mounted upon the rear end portions of the sills are rear track rails 14. Like the rails 12, these latter rails are also substantially T-shape in cross section and the horizontal flanges thereof are secured by suitable fastening devices to the sills for firmly connecting the rails thereto. The upstanding vertical flanges of said rails are cut away to form inclines 15 sloping to the summits of the rails and at the forward ends of said rails are upstanding stop lugs 16 while at the rear ends of the rails are upstanding stop lugs 17.

Movable upon the track rails 12 and 14 is an elevating carriage. This carriage includes a frame having substantially channel shaped inverted side members 18 connected at their end portions by front and rear cross bars 19 and 20 respectively. Beneath the ends of the front cross bar are arranged substantially wedge shaped spacing blocks 21 so that the upper face of said bar is thus inclined rearwardly and mounted upon the bar medially thereof is an upstanding cleat 22 arranged adjacent the front edge of the bar. The upper face of the cross bar 20 is preferably beveled to slope toward the rear end of the frame. Mounted between the side flanges of the channel members 18 is a pair of front rollers 23 arranged adjacent the forward ends of said members and similarly mounted adjacent the rear ends of said members is a pair of rear rollers 24, the rollers 23 coacting with the track rails 12 and the rollers 24 coacting with the track rails 14.

In use, the device is arranged in a garage or other desired place in such manner that a vehicle may be driven over the device and in order to more clearly bring out the operation of the device, I have shown a conventional type of motor vehicle 25 in connection therewith. Normally, the carriage will stand upon the track rails in the position shown in Fig. 3, the front rollers 23 of the carriage resting upon the inclines 13 of the front track rails and the rollers 24 abutting the stop lugs 17 of the rear track rails for limiting the carriage in its rearward movement. Consequently, when a motor vehicle is then driven over the carriage, the front axle of the vehicle will clear the carriage, the cross bar 19 being inclined for this reason, and will advance to engage the cleat 22 in the rear thereof. The forward movement of the vehicle will then serve to shift the carriage forwardly when the front pair of rollers 23, ascending the inclines 13 of the forward track rails, will serve to lift the front wheels of the vehicle clear of the ground. When this occurs the rear wheels of the vehicle will, as particularly shown in Fig. 2, still engage the ground since the rear pair of rollers 24 of the carriage will have advanced only to the foot of each of the inclines 15. However, as the forward movement of the vehicle and carriage continues, the rear rollers 24 will then immediately ride up the inclines 15 so that the cross bar 20 will be elevated to engage the differential housing upon the rear axle of the vehicle. The forward momentum of the vehicle will, of course, be considerable since the motive power of the vehicle is, as just previously explained, employed for lifting the front wheels of the vehicle. Consequently, after the cross bar 20 is moved to engage beneath the differential housing and the forward movement of the vehicle and carriage continues, the forward momentum of the vehicle will be sufficient to carry the rear rollers 24 up the inclines 15 so that the rear wheels of the vehicle will be elevated to clear the ground. It will accordingly be seen that I provide a device whereby the motive power of the vehicle is effectually employed for lifting the vehicle so that all of its wheels will be elevated and further, this may be quickly accomplished and without the use of lifting jacks or similar devices. Forward movement of the carriage will, as particularly shown in Fig. 1, be limited by the engagement of the rollers 24 with the stop lugs 16 of the rear track rails. To lower the vehicle it is simply necessary to push rearwardly thereon until the rollers 24 start down the inclines 15, when the weight of the vehicle will serve to shift the carriage rearwardly until the rollers 24 again engage the stop lugs 17, when all of the wheels of the vehicle will, of course, again rest upon the ground. In this connection, it will be observed that tilting of the front cross bar 19 will, of course, serve to facilitate clearance between the front axle of the vehicle and said bar when the vehicle is thus moved rearwardly and, similarly, the beveling of the upper face of the rear cross bar will serve to facilitate clearance between the differential housing and this latter bar.

Having thus described the invention, what is claimed as new is:

A lifting device comprising parallel longitudinal sills, connections between the sills whereby to maintain them in fixed parallel relation, front and rear track rails fixed longitudinally upon the sills and provided with downwardly and rearwardly extending inclines intermediate their ends and with supporting surfaces in advance of said inclines, upstanding stops on the rear rails at the forward extremities of said supporting surfaces, upstanding stops on said rails spaced rearwardly from the inclines thereon, a carriage having channeled side bars, rollers mounted between the side flanges of said channeled side bars to ride upon the track rails, the rollers and track rails being so spaced and so proportioned that when the forward rollers are respectively at the foot of the adjacent incline the rear rollers will be spaced rearwardly from the inclines on the rear rails and against the rear stops on said rails, cross bars connecting the channelled side bars adjacent the front and rear ends thereof and having downwardly and rearwardly inclined upper surfaces, and an abutment secured centrally upon the forward cross bar to be engaged by a traveling vehicle whereby the progress of the vehicle will cause the carriage to travel up the inclines on the track rails and lift the vehicle.

In testimony whereof I affix my signature.

JOHN H. FANGMANN. [L. S.]